United States Patent
Saito

(10) Patent No.: US 10,577,277 B2
(45) Date of Patent: Mar. 3, 2020

(54) GLASS

(71) Applicant: Nippon Electric Glass Co., Ltd., Shiga (JP)

(72) Inventor: Atsuki Saito, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/562,459

(22) PCT Filed: Apr. 1, 2016

(86) PCT No.: PCT/JP2016/060913
§ 371 (c)(1),
(2) Date: Sep. 28, 2017

(87) PCT Pub. No.: WO2016/159344
PCT Pub. Date: Oct. 6, 2016

(65) Prior Publication Data
US 2018/0086660 A1  Mar. 29, 2018

(30) Foreign Application Priority Data

Apr. 3, 2015 (JP) .................. 2015-076617
Aug. 24, 2015 (JP) .................. 2015-164474

(51) Int. Cl.
| C03C 3/085 | (2006.01) |
| C03C 3/091 | (2006.01) |
| C03C 3/087 | (2006.01) |
| G09F 9/30  | (2006.01) |

(52) U.S. Cl.
CPC ............. *C03C 3/091* (2013.01); *C03C 3/085* (2013.01); *C03C 3/087* (2013.01); *G09F 9/301* (2013.01)

(58) Field of Classification Search
CPC ................. C03C 3/085; C03C 3/087
See application file for complete search history.

(56) References Cited

U.S. PATENT DOCUMENTS

| 5,489,558 | A  | * | 2/1996  | Moffatt ............. C03C 3/085 501/66 |
| 5,508,237 | A  | * | 4/1996  | Moffatt ............. C03C 3/085 501/69 |
| 8,796,165 | B2 | * | 8/2014  | Ellison ............. C03C 3/091 501/66 |
| 8,993,465 | B2 | * | 3/2015  | Ellison ............. C03C 3/087 501/69 |
| 9,162,919 | B2 | * | 10/2015 | Ellison ............. C03C 3/093 |
| 9,193,622 | B2 | * | 11/2015 | Tsujimura ........... C03C 3/091 |
| 9,440,875 | B2 | * | 9/2016  | Ellison ............. C03C 3/087 |
| 9,670,087 | B2 | * | 6/2017  | Tsujimura ........... C03C 3/087 |
| 2009/0286091 | A1 |   | 11/2009 | Danielson et al. |
| 2012/0135852 | A1 | * | 5/2012  | Ellison ............. C03C 3/091 501/66 |
| 2012/0149544 | A1 |   | 6/2012  | Nagai et al. |
| 2013/0274086 | A1 | * | 10/2013 | Tsujimura ........... C03C 3/087 501/66 |
| 2013/0296157 | A1 | * | 11/2013 | Ellison ............. C03C 3/087 501/59 |
| 2014/0049708 | A1 | * | 2/2014  | Murata ............. C03C 3/087 349/15 |
| 2014/0179510 | A1 | * | 6/2014  | Allan .............. C03C 3/093 501/67 |
| 2014/0249017 | A1 | * | 9/2014  | Allan .............. C03C 3/093 501/66 |
| 2014/0287905 | A1 | * | 9/2014  | Tokunaga ........... C03C 3/087 501/66 |
| 2014/0366581 | A1 | * | 12/2014 | Tokunaga ........... C03C 3/087 65/135.7 |
| 2015/0087494 | A1 | * | 3/2015  | Tokunaga ........... C03C 3/112 501/67 |
| 2015/0175474 | A1 | * | 6/2015  | Ellison ............. C03C 3/087 501/59 |
| 2016/0002095 | A1 | * | 1/2016  | Tsujimura ........... C03C 3/087 501/66 |
| 2016/0039710 | A1 | * | 2/2016  | Tokunaga ........... C03C 3/091 501/59 |
| 2016/0122229 | A1 | * | 5/2016  | Bowden ............. C03C 3/093 501/67 |
| 2017/0260085 | A1 | * | 9/2017  | Tokunaga ........... C03C 3/091 |
| 2018/0016183 | A1 | * | 1/2018  | Bowden ............. C03C 3/087 |
| 2018/0319700 | A1 | * | 11/2018 | Ding ............... C03C 3/091 |

FOREIGN PATENT DOCUMENTS

| CN | 102471134 |   | 5/2012  |           |
| JP | 10045422  | * | 2/1998  |           |
| JP | 2006169107 A | * | 6/2006 | ............ C03C 3/085 |
| JP | 2011-105554 |   | 6/2011 |           |
| JP | 2012-184146 |   | 9/2012 |           |
| JP | 2012-236759 |   | 12/2012 |          |
| JP | 2015027932 A | * | 2/2015 |           |

OTHER PUBLICATIONS

International Search Report dated May 31, 2016 in International (PCT) Application No. PCT/JP2016/060913.
International Preliminary Report on Patentability dated Oct. 3, 2017 in International (PCT) Application No. PCT/JP2016/060913.
Office Action dated May 7, 2019 in Chinese Patent Application No. 201680009894.4, with English-language translation.

* cited by examiner

*Primary Examiner* — Karl E Group
(74) *Attorney, Agent, or Firm* — Wenderoth, Lind & Ponack, L.L.P.

(57) ABSTRACT

Devised is a glass which has high heat resistance and a low thermal expansion coefficient, and is excellent in productivity. A glass of the present invention includes as a glass composition, in terms of mol %, 55% to 80% of $SiO_2$, 12% to 30% of $Al_2O_3$, 0% to 3% of $B_2O_3$, 0% to 1% of $Li_2O+Na_2O+K_2O$, and 5% to 35% of $MgO+CaO+SrO+BaO$, and has a thermal expansion coefficient within a temperature range of from 30° C. to 380° C. of less than $40 \times 10^{-7}$/° C.

12 Claims, No Drawings

GLASS

TECHNICAL FIELD

The present invention relates to a glass, and more specifically, to an alkali-free glass suitable for a substrate of an OLED display or a liquid crystal display.

BACKGROUND ART

An electronic device, such as an OLED display, is used in applications such as a display of a cellular phone because the electronic device is thin, is excellent in displaying a moving image, and has low power consumption.

A glass substrate is widely used as a substrate of an OLED display. An alkali-free glass (glass in which the content of an alkali component is 0.5 mol % or less in a glass composition) is used for the glass substrate of this application. With this, a situation in which an alkali ion is diffused in a heat treatment step into a semiconductor substance having been formed into a film can be prevented.

SUMMARY OF INVENTION

Technical Problem

For example, the alkali-free glass of this application is required to satisfy the following demand characteristics (1) to (3).
(1) To be excellent in productivity, particularly excellent in devitrification resistance and meltability in order to achieve a reduction in cost of a glass substrate.
(2) To have a high strain point in order to reduce thermal shrinkage of the glass substrate in a production process for, for example, a p-Si TFT, particularly a high temperature p-Si TFT.
(3) To have a thermal expansion coefficient low enough to match the thermal expansion coefficient of a film member to be formed on the glass substrate (for example, of p-Si).

However, it is not easy to balance the demand characteristics (1) and (2). Specifically, when the strain point of the alkali-free glass is to be increased, the devitrification resistance and the meltability are liable to be reduced. In contrast, when the devitrification resistance and meltability of the alkali-free glass are to be increased, the strain point is liable to be reduced.

In addition, it is also not easy to balance the demand characteristics (1) and (3). Specifically, when the thermal expansion coefficient of the alkali-free glass is to be reduced, the devitrification resistance and the meltability are liable to be reduced. In contrast, when the devitrification resistance and meltability of the alkali-free glass are to be increased, the thermal expansion coefficient is liable to be increased.

In addition, in general, chemical etching for a glass substrate is employed in order to reduce the thickness of a display. This method involves immersing a display panel obtained by bonding two glass substrates in a hydrofluoric acid (HF)-based chemical to reduce the thicknesses of the glass substrates. Therefore, when the chemical etching for a glass substrate is performed, the glass is required to have a high etching rate in HF in order to increase the production efficiency of the display panel, in addition to satisfying the demand characteristics (1) to (3).

Further, in some cases, the glass is required to have a high Young's modulus (or a high specific Young's modulus) in order to suppress failures attributed to the deflection of the glass substrate.

The present invention has been made in view of the above-mentioned circumstances, and a technical object of the present invention is to devise a glass which has high heat resistance, has a low thermal expansion coefficient, and is excellent in productivity.

Solution to Problem

The inventor of the present invention has repeatedly performed various experiments. As a result, the inventor has found that the technical object can be achieved by restricting a glass composition within a predetermined range. Thus, the inventor proposes the finding as the present invention. That is, according to one embodiment of the present invention, there is provided a glass, comprising as a glass composition, in terms of mol %, 55% to 80% of $SiO_2$, 12% to 30% of $Al_2O_3$, 0% to 3% of $B_2O_3$, 0% to 1% of $Li_2O+Na_2O+K_2O$, and 5% to 35% of MgO+CaO+SrO+BaO, and having a thermal expansion coefficient within a temperature range of from 30° C. to 380° C. of less than $40\times10^{-7}$/° C. Herein, the content of "$Li_2O+Na_2O+K_2O$" refers to the total content of $Li_2O$, $Na_2O$, and $K_2O$. The content of "MgO+CaO+SrO+BaO" refers to the total content of MgO, CaO, SrO, and BaO. The "thermal expansion coefficient within a temperature range of from 30° C. to 380° C." refers to an average value measured with a dilatometer.

In the glass according to the embodiment of the present invention, the content of $Al_2O_3$ is restricted to 12 mol % or more, the content of $B_2O_3$ is restricted to 3 mol % or less, and the content of $Li_2O+Na_2O+K_2O$ is restricted to 1 mol % or less in the glass composition. With this, a strain point is remarkably increased, and hence the heat resistance of a glass substrate can be significantly increased. Further, a thermal expansion coefficient is easily reduced.

In addition, the glass according to the embodiment of the present invention comprises 5 mol % to 35 mol % of MgO+CaO+SrO+BaO in the glass composition. With this, devitrification resistance can be increased.

Secondly, it is preferred that the glass according to the embodiment of the present invention have a content of $B_2O_3$ of less than 1 mol %.

Thirdly, it is preferred that the glass according to the embodiment of the present invention have a content of $Li_2O+Na_2O+K_2O$ of 0.5 mol % or less.

Fourthly, it is preferred that the glass according to the embodiment of the present invention have a molar ratio (MgO+CaO+SrO+BaO)/$Al_2O_3$ of from 0.3 to 3. Herein, the "molar ratio (MgO+CaO+SrO+BaO)/$Al_2O_3$" refers to a value obtained by dividing the total content of MgO, CaO, SrO, and BaO by the content of $Al_2O_3$.

Fifthly, it is preferred that the glass according to the embodiment of the present invention have a molar ratio MgO/(MgO+CaO+SrO+BaO) of 0.5 or more. Herein, the "molar ratio MgO/(MgO+CaO+SrO+BaO)" refers to a value obtained by dividing the content of MgO by the total content of MgO, CaO, SrO, and BaO.

Sixthly, it is preferred that the glass according to the embodiment of the present invention have a strain point of 750° C. or more. Herein, the "strain point" refers to a value measured by a method in accordance with ASTM C336.

Seventhly, it is preferred that the glass according to the embodiment of the present invention have a strain point of 800° C. or more.

Eighthly, it is preferred that the glass according to the embodiment of the present invention have a difference of (a temperature at a viscosity of $10^{2.5}$ dPa·s-strain point) of 1,000° C. or less. Herein, the "temperature at a viscosity at high temperature of $10^{2.5}$ dPa·s" refers to a value measured by a platinum sphere pull up method.

Ninthly, it is preferred that the glass according to the embodiment of the present invention have a temperature at a viscosity of $10^{2.5}$ dPa·s of 1,800° C. or less.

Tenthly, it is preferred that the glass according to the embodiment of the present invention have a flat sheet shape.

Eleventhly, it is preferred that the glass according to the embodiment of the present invention be used for a substrate of an OLED display.

DESCRIPTION OF EMBODIMENTS

A glass of the present invention comprises as a glass composition, in terms of mol %, 55% to 80% of $SiO_2$, 12% to 30% of $Al_2O_3$, 0% to 3% of $B_2O_3$, 0% to 1% of $Li_2O+Na_2O+K_2O$, and 5% to 35% of $MgO+CaO+SrO+BaO$. The reasons why the contents of the components are restricted as described above are hereinafter described. The expression "%" refers to "mol %" in the descriptions of the components.

The lower limit of the content range of $SiO_2$ is preferably 55% or more, 58% or more, 60% or more, or 65% or more, particularly preferably 68% or more, and the upper limit of the content range of $SiO_2$ is preferably 80% or less, 75% or less, 73% or less, 72% or less, or 71% or less, particularly preferably 70% or less. When the content of $SiO_2$ is too small, a defect caused by a devitrified crystal containing $Al_2O_3$ is liable to occur, and in addition, a strain point is liable to lower. In addition, a viscosity at high temperature lowers, and thus a liquidus viscosity is liable to lower. Meanwhile, when the content of $SiO_2$ is too large, a thermal expansion coefficient lowers more than necessary. Besides, the viscosity at high temperature increases, and thus meltability is liable to lower. Further, for example, a devitrified crystal containing $SiO_2$ is liable to be generated.

The lower limit of the content range of $Al_2O_3$ is preferably 12% or more, 13% or more, or 14% or more, particularly preferably 15% or more, and the upper limit of the content range of $Al_2O_3$ is preferably 30% or less, 25% or less, 20% or less, or 17% or less, particularly preferably 16% or less. When the content of $Al_2O_3$ is too small, a Young's modulus is liable to lower or the strain point is liable to lower. In addition, the viscosity at high temperature increases, and thus the meltability is liable to lower. Meanwhile, when the content of $Al_2O_3$ is too large, the devitrified crystal containing $Al_2O_3$ is liable to be generated.

The molar ratio $SiO_2/Al_2O_3$ is preferably from 2 to 6, from 3 to 5.5, from 3.5 to 5.5, from 4 to 5.5, or from 4.5 to 5.5, particularly preferably from 4.5 to 5 from the viewpoint of achieving both a high strain point and high devitrification resistance. The "molar ratio $SiO_2/Al_2O_3$" refers to a value obtained by dividing the content of $SiO_2$ by the content of $Al_2O_3$.

The upper limit of the content range of $B_2O_3$ is preferably 3% or less, 1% or less, or less than 1%, particularly preferably 0.1% or less. When the content of $B_2O_3$ is too large, there is a risk in that the strain point may significantly lower or the Young's modulus may significantly lower.

The upper limit of the content range of $Li_2O+Na_2O+K_2O$ is preferably 1% or less, less than 1%, or 0.5% or less, particularly preferably 0.2% or less. When the content of $Li_2O+Na_2O+K_2O$ is too large, an alkali ion is diffused into a semiconductor substance, for example, in a production process for a high temperature p-Si TFT, and thus the characteristics of a semiconductor are liable to deteriorate. The upper limit of the content range of each of $Li_2O$, $Na_2O$, and $K_2O$ is preferably 1% or less, less than 1%, 0.5% or less, or 0.3% or less, particularly preferably 0.2% or less.

The lower limit of the content range of $MgO+CaO+SrO+BaO$ is preferably 5% or more, 7% or more, 9% or more, 11% or more, or 13% or more, particularly preferably 14% or more, and the upper limit of the content range of $MgO+CaO+SrO+BaO$ is preferably 35% or less, 30% or less, 25% or less, 20% or less, 18% or less, or 17% or less, particularly preferably 16% or less. When the content of $MgO+CaO+SrO+BaO$ is too small, a liquidus temperature significantly increases, and thus a devitrified crystal is liable to be generated in the glass. In addition, the viscosity at high temperature increases, and thus the meltability is liable to lower. Meanwhile, when the content of $MgO+CaO+SrO+BaO$ is too large, the strain point is liable to lower. In addition, a devitrified crystal containing an alkaline earth element is liable to be generated.

The lower limit of the content range of MgO is preferably 0% or more, 1% or more, 2% or more, 3% or more, 4% or more, or 5% or more, particularly preferably 6% or more, and the upper limit of the content range of MgO is preferably 15% or less, 10% or less, or 8% or less, particularly preferably 7% or less. When the content of MgO is too small, the meltability is liable to lower or the devitrification property of a crystal containing an alkaline earth element is liable to increase. Meanwhile, when the content of MgO is too large, precipitation of the devitrified crystal containing $Al_2O_3$ is accelerated, with the result that the liquidus viscosity lowers or the strain point significantly lowers. MgO exhibits an effect of increasing the Young's modulus most remarkably among the alkaline earth metal oxides.

The lower limit of the content range of CaO is preferably 2% or more, 3% or more, 4% or more, 5% or more, or 6% or more, particularly preferably 7% or more, and the upper limit of the content range of CaO is preferably 20% or less, 15% or less, 12% or less, 11% or less, or 10% or less, particularly preferably 9% or less. When the content of CaO is too small, the meltability is liable to lower. Meanwhile, when the content of CaO is too large, the liquidus temperature increases, and thus the devitrified crystal is liable to be generated in the glass. CaO has high effects of improving the liquidus viscosity and increasing the meltability without lowering the strain point as compared to other alkaline earth metal oxides. In addition, CaO is a component effective for increasing the Young's modulus, while slightly less effective than MgO.

The lower limit of the content range of SrO is preferably 0% or more or 1% or more, particularly preferably 2% or more, and the upper limit of the content range of SrO is preferably 10% or less, 8% or less, 7% or less, 6% or less, or 5% or less, particularly preferably 4% or less. When the content of SrO is too small, the strain point is liable to lower. Meanwhile, when the content of SrO is too large, the liquidus temperature increases, and thus the devitrified crystal is liable to be generated in the glass. In addition, the meltability is liable to lower. Further, when the content of SrO is large in coexistence with CaO, devitrification resistance tends to lower.

The lower limit of the content range of BaO is preferably 0% or more, 1% or more, 2% or more, or 3% or more, particularly preferably 4% or more, and the upper limit of the content range of BaO is preferably 15% or less, 12% or less, or 11% or less, particularly preferably 10% or less. When the content of BaO is too small, the strain point and the thermal expansion coefficient are liable to lower. Meanwhile, when the content of BaO is too large, the liquidus temperature increases, and thus the devitrified crystal is liable to be generated in the glass. In addition, the meltability is liable to lower. BaO is an element which has the greatest reduction effect on the Young's modulus among the alkaline earth metal oxides. Therefore, from the viewpoint of increasing the Young's modulus, it is necessary to reduce the content of BaO to the extent possible, or when the content of BaO is large, to adopt a design in which BaO coexists with MgO.

From the viewpoint of increasing the devitrification resistance, the lower limit of the range of the molar ratio MgO/CaO is preferably 0.1 or more, 0.2 or more, or 0.3 or more, particularly preferably 0.4 or more, and the upper limit of the range of the molar ratio MgO/CaO is preferably 2 or less, 1 or less, 0.8 or less, or 0.7 or less, particularly preferably 0.6 or less. The "molar ratio MgO/CaO" refers to a value obtained by dividing the content of MgO by the content of CaO.

From the viewpoint of increasing the devitrification resistance, the lower limit of the range of the molar ratio BaO/CaO is preferably 0.2 or more, 0.5 or more, 0.6 or more, or 0.7 or more, particularly preferably 0.8 or more, and the upper limit of the range of the molar ratio BaO/CaO is preferably 5 or less, 4.5 or less, 3 or less, or 2.5 or less, particularly preferably 2 or less. The "molar ratio BaO/CaO" refers to a value obtained by dividing the content of BaO by the content of CaO.

In view of a balance between the strain point and the meltability, the lower limit of the range of the molar ratio (MgO+CaO+SrO+BaO)/$Al_2O_3$ is preferably 0.3 or more, 0.5 or more, or 0.7 or more, particularly preferably 0.8 or more, and the upper limit of the range of the molar ratio (MgO+CaO+SrO+BaO)/$Al_2O_3$ is preferably 3.0 or less, 2.5 or less, 2.0 or less, 1.5 or less, or 1.2 or less, particularly preferably 1.1 or less.

The molar ratio MgO/(MgO+CaO+SrO+BaO) is preferably 0.5 or more, particularly preferably 0.6 or more. With this, the meltability is easily increased. However, MgO is a component which significantly reduces the strain point, and hence a reduction effect on the strain point is remarkable in a region in which the content of MgO is large. Therefore, it is preferred that the content ratio of MgO in the alkaline earth metal oxides be small, and the molar ratio MgO/(MgO+CaO+SrO+BaO) is preferably 0.8 or less, particularly preferably 0.7 or less.

The value 7×[MgO]+5×[CaO]+4×[SrO]+4×[BaO] is preferably 100% or less, 90% or less, 80% or less, 70% or less, or 65% or less, particularly preferably 60% or less. The alkaline earth metal elements each have an effect of reducing the strain point, and its influence becomes larger as the ionic radius becomes smaller. Therefore, when the upper limit of the range of the value 7×[MgO]+5×[CaO]+4×[SrO]+4×[BaO] is restricted so that the ratio of an alkaline earth element having a larger ionic radius is larger, the strain point can preferentially be increased. The [MgO], the [CaO], the [SrO], and the [BaO] refer to the content of MgO, the content of CaO, the content of SrO, and the content of BaO, respectively. In addition, the "7×[MgO]+5×[CaO]+4×[SrO]+4×[BaO]" refers to the total amount of an amount seven times as large as the [MgO], an amount five times as large as the [CaO], an amount four times as large as the [SrO], and an amount four times as large as the [BaO].

The value 21×[MgO]+20×[CaO]+15×[SrO]+12×[BaO] is preferably 200% or more, 210% or more, 220% or more, 230% or more, 240% or more, or 250% or more, particularly preferably from 300% to 1,000%. The alkaline earth metal elements each have an effect of increasing the meltability, and its influence becomes larger as the ionic radius becomes smaller. Therefore, when the lower limit of the range of the value 21×[MgO]+20×[CaO]+15×[SrO]+12×[BaO] is restricted so that the ratio of an alkaline earth element having a smaller ionic radius is smaller, the meltability can preferentially be increased. However, when the value 21×[MgO]+20×[CaO]+15×[SrO]+12×[BaO] is too large, there is a risk in that the strain point may be reduced. The "21×[MgO]+20×[CaO]+15×[SrO]+12×[BaO]" refers to the total amount of an amount 21 times as large as the [MgO], an amount 20 times as large as the [CaO], an amount 15 times as large as the [SrO], and an amount 12 times as large as the [BaO].

According to the investigations made by the inventor of the present invention, when the content of $Al_2O_3$ is large and the ratio of the alkaline earth element having a smaller ionic radius is large (in particular, the content of MgO is large and the content of BaO is small), the Young's modulus can effectively be increased. Therefore, the value 9×[$Al_2O_3$]+7×[MgO]−4×[BaO] is preferably 95% or more, 105% or more, 115% or more, or 125% or more, particularly preferably 135% or more. The "9×[$Al_2O_3$]+7×[MgO]−4×[BaO]" refers to an amount obtained by subtracting an amount four times as large as the [BaO] from the total amount of an amount nine times as large as the [$Al_2O_3$] and an amount seven times as large as the [MgO].

The value [MgO]+[CaO]+3×[SrO]+4×[BaO] is preferably 27% or less, 26% or less, 25% or less, or 24% or less, particularly preferably 23% or less. When the value [MgO]+[CaO]+3×[SrO]+4×[BaO] is too large, a density is liable to increase, and thus a specific Young's modulus lowers, with the result that the amount of deflection of a glass substrate under its own weight is liable to increase. The "[MgO]+[CaO]+3×[SrO]+4×[BaO]" refers to the total amount of the [MgO], the [CaO], an amount three times as large as the [SrO], and an amount four times as large as the [BaO].

Other than the above-mentioned components, the following components may be introduced in the glass composition.

ZnO is a component which increases the meltability. However, when ZnO is contained in a large amount in the glass composition, the glass is liable to devitrify, and in addition, the strain point is liable to lower. Therefore, the content of ZnO is preferably from 0% to 5%, from 0% to 3%, from 0% to 0.5%, or from 0% to 0.3%, particularly preferably from 0% to 0.1%.

$ZrO_2$ is a component which increases the Young's modulus. The content of $ZrO_2$ is preferably from 0% to 5%, from 0% to 3%, from 0% to 0.5%, or from 0% to 0.2%, particularly preferably from 0% to 0.02%. When the content of $ZrO_2$ is too large, the liquidus temperature increases, and thus a devitrified crystal of zircon is liable to be precipitated.

$TiO_2$ is a component which lowers the viscosity at high temperature and thus increases the meltability, and is also a component which suppresses solarisation. However, when $TiO_2$ is contained in a large amount in the glass composition, the glass is liable to be colored. Therefore, the content of $TiO_2$ is preferably from 0% to 5%, from 0% to 3%, from 0% to 1%, or from 0% to 0.1%, particularly preferably from 0% to 0.02%.

$P_2O_5$ is a component which increases the devitrification resistance. However, when $P_2O_5$ is contained in a large amount in the glass composition, the glass is liable to be phase separated and turn milky white. In addition, there is a risk in that water resistance may significantly lower. Therefore, the content of $P_2O_5$ is preferably from 0% to 5%, from 0% to 4%, from 0% to 3%, from 0% to less than 2%, from 0% to 1%, or from 0% to 0.5%, particularly preferably from 0% to 0.1%.

SnO$_2$ is a component which has a satisfactory fining effect in a high temperature region, and is also a component which lowers the viscosity at high temperature. The content of SnO$_2$ is preferably from 0% to 1%, from 0.01% to 0.5%, or from 0.01% to 0.3%, particularly preferably from 0.04% to 0.1%. When the content of SnO$_2$ is too large, a devitrified crystal of SnO$_2$ is liable to be precipitated.

As described above, it is preferred to add SnO$_2$ as a fining agent to the glass of the present invention, but CeO$_2$, SO$_3$, C, and metal powder (for example, of Al, Si, or the like) may be added at up to 1% as a fining agent as long as the characteristics of the glass are not impaired.

Also As$_2$O$_3$, Sb$_2$O$_3$, F, and Cl act effectively as a fining agent. The glass of the present invention does not exclude the incorporation of those components, but from an environmental viewpoint, the contents of those components are each preferably less than 0.1%, particularly preferably less than 0.05%.

In the case where the content of SnO$_2$ is from 0.01% to 0.5%, the glass is liable to be colored when the content of Rh$_2$O$_3$ is too large. Rh$_2$O$_3$ may be mixed in from a manufacturing vessel made of platinum. The content of Rh$_2$O$_3$ is preferably from 0% to 0.0005%, more preferably from 0.00001% to 0.0001%.

SO$_3$ is a component that is mixed in from a raw material as an impurity. When the content of SO$_3$ is too large, bubbles called reboil are generated during melting and forming, and defects may occur in the glass. The lower limit of the content range of SO$_3$ is preferably 0.0001% or more, and the upper limit of the content range of SO$_3$ is preferably 0.005% or less, 0.003% or less, or 0.002% or less, particularly preferably 0.001% or less.

The content of a rare earth oxide (an oxide of Sc, Y, La, Ce, Pr, Nd, Sm, Eu, Gd, Tb, Dy, Ho, Er, Tm, Yb, Lu, or the like) is preferably less than 2% or 1% or less, particularly preferably less than 1%. In particular, the content of La$_2$O$_3$+Y$_2$O$_3$ is preferably less than 2%, less than 1%, or less than 0.5%, particularly preferably less than 0.1%. The content of La$_2$O$_3$ is preferably less than 2%, less than 1%, or less than 0.5%, particularly preferably less than 0.1%. When the content of the rare earth oxide is too large, batch cost is liable to increase. The "content of Y$_2$O$_3$+La$_2$O$_3$" refers to the total content of Y$_2$O$_3$ and La$_2$O$_3$.

The glass of the present invention preferably has the following characteristics.

The density is preferably 2.80 g/cm$^3$ or less, 2.70 g/cm$^3$ or less, or 2.60 g/cm$^3$ or less, particularly preferably 2.50 g/cm$^3$ or less. When the density is too high, it becomes difficult to achieve a reduction in weight of a display.

The thermal expansion coefficient within a temperature range of from 30° C. to 380° C. is preferably less than 40×10$^{-7}$/° C., 38×10$^{-7}$/° C. or less, 36×10$^{-7}$/° C. or less, or 34×10$^{-7}$/° C. or less, particularly preferably from 28×10$^{-7}$/° C. to 33×10$^{-7}$/° C. When the thermal expansion coefficient within a temperature range of from 30° C. to 380° C. is too high, the thermal expansion coefficient is difficult to match that of a film member to be formed on a glass substrate (for example, of p-Si), and warpage is liable to occur in the glass substrate.

The strain point is preferably 750° C. or more, 780° C. or more, 800° C. or more, 810° C. or more, or 820° C. or more, particularly preferably from 830° C. to 1,000° C. When the strain point is too low, the glass substrate is liable to undergo thermal shrinkage in a heat treatment step.

The Young's modulus is preferably more than 75 GPa, 77 GPa or more, 78 GPa or more, or 79 GPa or more, particularly preferably 80 GPa or more. When the Young's modulus is too low, failures attributed to the deflection of the glass substrate, for example, failures such as an image on the screen of an electronic device looking distorted are liable to occur.

The specific Young's modulus is preferably more than 30 GPa/(g/cm$^3$), 30.2 GPa/(g/cm$^3$) or more, 30.4 GPa/(g/cm$^3$) or more, or 30.6 GPa/(g/cm$^3$) or more, particularly preferably 30.8 GPa/(g/cm$^3$) or more. When the specific Young's modulus is too low, failures attributed to the deflection of the glass substrate, for example, failures such as breakage of the glass substrate in its conveyance are liable to occur.

The etching depth obtained through immersion in a 10 mass % HF aqueous solution at room temperature for 30 minutes is preferably 25 μm or more, 27 μm or more, 28 μm or more, or from 29 μm to 50 μm, particularly preferably from 30 μm to 45 μm. The etching depth serves as an indicator of an etching rate. Specifically, a large etching depth indicates a high etching rate, and a small etching depth indicates a low etching rate. While the etching rate is increased easily by reducing the content of SiO$_2$, the etching rate is easily increased also by preferentially introducing, among the alkaline earth metals, an element having a larger ionic radius.

The SiO$_2$—Al$_2$O$_3$—RO-based (RO represents an alkaline earth metal oxide) glass according to the present invention is generally hard to melt. Therefore, the enhancement of the meltability is an issue. When the meltability is enhanced, a defective rate attributed to bubbles, foreign matter, or the like is reduced, and hence a high-quality glass substrate can be supplied at low cost in a large number. In contrast, when the viscosity at high temperature is too high, removal of bubbles is less promoted in a melting step. Therefore, the temperature at a viscosity at high temperature of 10$^{2.5}$ dPa·s is preferably 1,800° C. or less, 1,750° C. or less, 1,700° C. or less, 1,680° C. or less, 1,670° C. or less, or 1,650° C. or less, particularly preferably 1,630° C. or less. The temperature at a viscosity at high temperature of 10$^{2.5}$ dPa·s corresponds to a melting temperature. As the temperature becomes lower, the meltability becomes more excellent.

A difference of (temperature at a viscosity of 10$^{2.5}$ dPa·s-strain point) is preferably 1,000° C. or less, 900° C. or less, or 850° C. or less, particularly preferably 800° C. or less from the viewpoint of achieving both a high strain point and a low melting temperature.

When the glass is formed into a flat sheet shape, the devitrification resistance is important. In consideration of the forming temperature of the SiO$_2$—Al$_2$O$_3$—RO-based glass according to the present invention, the liquidus temperature is preferably 1,450° C. or less or 1,400° C. or less, particularly preferably 1,300° C. or less. In addition, the liquidus viscosity is preferably 10$^{3.0}$ dPa·s or more or 10$^{3.5}$ dPa·s or more, particularly preferably 10$^{4.0}$ dPa·s or more. The "liquidus temperature" refers to a value obtained by measuring a temperature at which a crystal precipitates when glass powder that passed through a standard 30-mesh sieve (500 μm) and remained on a 50-mesh sieve (300 μm) is placed in a platinum boat and kept for 24 hours in a gradient heating furnace. The "liquidus viscosity" refers to a value obtained by measuring the viscosity of the glass at the liquidus temperature by a platinum sphere pull up method.

The glass of the present invention may be formed by various forming methods. The glass may be formed into a glass substrate, for example, by an overflow down-draw method, a slot down-draw method, a redraw method, a float method, a roll-out method, or the like. When the glass is formed into a glass substrate by an overflow down-draw method, the glass substrate to be produced easily has high surface smoothness.

When the glass of the present invention has a flat sheet shape, the thickness thereof is preferably 1.0 mm or less, 0.7 mm or less, or 0.5 mm or less, particularly preferably 0.4 mm or less. As the thickness becomes smaller, the weight of an electronic device can be reduced more easily. In contrast, as the thickness becomes smaller, the glass substrate is more liable to be deflected. However, because the glass of the present invention has a high Young's modulus and a high specific Young's modulus, failures attributed to deflection do not easily occur. The thickness can be adjusted by controlling, for example, the flow rate and the sheet-drawing speed at the time of forming.

In the glass of the present invention, the strain point can be increased by reducing the β-OH value. The β-OH value is preferably 0.45/mm or less, 0.40/mm or less, 0.35/mm or less, 0.30/mm or less, 0.25/mm or less, or 0.20/mm or less, particularly preferably 0.15/mm or less. When the β-OH value is too large, the strain point is liable to lower. When the β-OH value is too small, the meltability is liable to lower. Therefore, the β-OH value is preferably 0.01/mm or more, particularly preferably 0.05/mm or more.

A method of reducing the β-OH value is exemplified by the following methods: (1) a method involving selecting raw materials having low water contents; (2) a method involving adding a component (such as Cl or $SO_3$) that reduces the water content in the glass; (3) a method involving reducing the water content in a furnace atmosphere; (4) a method involving performing $N_2$ bubbling in the molten glass; (5) a method involving adopting a small melting furnace; (6) a method involving increasing the flow rate of the molten glass; and (7) a method involving adopting an electric melting method.

Herein, the "β-OH value" refers to a value calculated by using the following equation after measuring the transmittances of the glass with an FT-IR.

$$\beta\text{-OH value} = (1/X)\log(T_1/T_2)$$

X: Glass thickness (mm)
$T_1$: Transmittance (%) at a reference wavelength of 3,846 $cm^{-1}$
$T_2$: Minimum transmittance (%) at a wavelength around a hydroxyl group absorption wavelength of 3,600 $cm^{-1}$

EXAMPLES

The present invention is hereinafter described in detail by way of Examples. However, Examples below are merely examples, and the present invention is by no means limited to Examples below.

Tables 1 to 4 show Examples of the present invention (Sample Nos. 1 to 58).

TABLE 1

| | | No. 1 | No. 2 | No. 3 | No. 4 | No. 5 | No. 6 | No. 7 | No. 8 | No. 9 |
|---|---|---|---|---|---|---|---|---|---|---|
| Composition (mol %) | $SiO_2$ | 75.2 | 59.9 | 59.9 | 64.9 | 64.9 | 69.9 | 69.9 | 69.9 | 69.9 |
| | $Al_2O_3$ | 14.8 | 25.0 | 25.0 | 20.0 | 20.0 | 15.0 | 15.0 | 20.0 | 20.0 |
| | $B_2O_3$ | 0.0 | 0.0 | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 | 0.0 | 0.0 |
| | MgO | 0.0 | 15.0 | 0.0 | 15.0 | 0.0 | 15.0 | 0.0 | 10.0 | 0.0 |
| | CaO | 0.0 | 0.0 | 15.0 | 0.0 | 15.0 | 0.0 | 15.0 | 0.0 | 10.0 |
| | SrO | 0.0 | 0.0 | 0.0 | 0.0 | 0.0 | 0.0 | 0.0 | 0.0 | 0.0 |
| | BaO | 9.9 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 |
| $Li_2O + Na_2O + K_2O$ | | 0.0 | 0.0 | 0.0 | 0.0 | 0.0 | 0.0 | 0.0 | 0.0 | 0.0 |
| MgO + CaO + SrO + BaO | | 9.9 | 15.0 | 15.0 | 15.0 | 15.0 | 15.0 | 15.0 | 10.0 | 10.0 |
| (Mg + Ca + Sr + Ba)/Al | | 0.67 | 0.60 | 0.60 | 0.75 | 0.75 | 1.00 | 1.00 | 0.50 | 0.50 |
| ρ [g/cm$^3$] | | 2.73 | 2.59 | 2.61 | 2.54 | 2.57 | 2.48 | 2.52 | 2.49 | 2.51 |
| α [×10$^{-7}$/° C.] | | 36.0 | 32.0 | 38.2 | 30.4 | 37.6 | 28.7 | 39.1 | 26.5 | 30.7 |
| Young's modulus [GPa] | | 77.8 | 102.3 | 94.0 | 97.2 | 89.5 | 91.9 | 84.8 | 94.2 | 89.1 |
| Specific Young's modulus [GPa/(g/cm$^3$)] | | 28.5 | 39.5 | 36.0 | 38.3 | 34.9 | 37.0 | 33.7 | 37.8 | 35.5 |
| Ps [° C.] | | 835 | Not measured | 809 | Not measured | 808 | Not measured | 808 | Not measured | 809 |
| Ta [° C.] | | 904 | Not measured | 858 | Not measured | 861 | Not measured | 862 | Not measured | 870 |
| Ts [° C.] | | Not measured | Not measured | 1,042 | Not measured | 1,060 | 1,044 | 1,073 | Not measured | 1,078 |
| Temperature at $10^{4.0}$ dPa · s [° C.] | | 1,516 | Not measured | Not measured | Not measured | 1,327 | 1,330 | 1,362 | Not measured | Not measured |
| Temperature at $10^{3.0}$ dPa · s [° C.] | | 1,688 | Not measured | Not measured | Not measured | 1,453 | 1,475 | 1,515 | Not measured | Not measured |
| Temperature at $10^{2.5}$ dPa · s [° C.] | | 1,800 | Not measured | Not measured | Not measured | 1,538 | 1,568 | 1,612 | Not measured | Not measured |
| TL [° C.] | | 1,515 | Not measured | Not measured | Not measured | 1,509 | 1,444 | 1,403 | Not measured | Not measured |
| logηTL [dPa · s] | | 4.0 | Not measured | Not measured | Not measured | 2.7 | Not measured | 3.7 | Not measured | Not measured |

TABLE 1-continued

| | | | No. 10 | No. 11 | No. 12 | No. 13 | No. 14 | No. 15 | No. 16 |
|---|---|---|---|---|---|---|---|---|---|
| Temperature at $10^{2.5}$ dPa·s − Ps [° C.] | | | 965 | Not measured | Not measured | Not measured | 730 | Not measured | 804 | Not measured | Not measured |
| β-OH [/mm] | | | Not measured | Not measured | Not measured | Not measured | Not measured | Not measured | 0.10 | Not measured | Not measured |

| | | | No. 10 | No. 11 | No. 12 | No. 13 | No. 14 | No. 15 | No. 16 |
|---|---|---|---|---|---|---|---|---|---|
| Composition (mol %) | | $SiO_2$ | 69.9 | 69.9 | 69.9 | 69.9 | 69.9 | 69.9 | 69.9 |
| | | $Al_2O_3$ | 20.0 | 20.0 | 15.0 | 15.0 | 15.0 | 13.0 | 13.0 |
| | | $B_2O_3$ | 0.0 | 0.0 | 0.0 | 0.0 | 0.0 | 0.0 | 0.0 |
| | | $Li_2O$ | 0.0 | 0.0 | 0.0 | 0.0 | 0.0 | 0.0 | 0.0 |
| | | $Na_2O$ | 0.0 | 0.0 | 0.0 | 0.0 | 0.0 | 0.0 | 0.0 |
| | | $K_2O$ | 0.0 | 0.0 | 0.0 | 0.0 | 0.0 | 0.0 | 0.0 |
| | | MgO | 0.0 | 0.0 | 7.5 | 7.5 | 7.5 | 8.5 | 8.5 |
| | | CaO | 0.0 | 0.0 | 7.5 | 0.0 | 0.0 | 8.5 | 0.0 |
| | | SrO | 10.0 | 0.0 | 0.0 | 7.5 | 0.0 | 0.0 | 8.5 |
| | | BaO | 0.0 | 10.0 | 0.0 | 0.0 | 7.5 | 0.0 | 0.0 |
| | | $SnO_2$ | 0.1 | 0.1 | 0.1 | 0.1 | 0.1 | 0.1 | 0.1 |
| $Li_2O + Na_2O + K_2O$ | | | 0.0 | 0.0 | 0.0 | 0.0 | 0.0 | 0.0 | 0.0 |
| MgO + CaO + SrO + BaO | | | 10.0 | 10.0 | 15.0 | 15.0 | 15.0 | 17.0 | 17.0 |
| (Mg + Ca + Sr + Ba)/Al | | | 0.50 | 0.50 | 1.00 | 1.00 | 1.00 | 1.31 | 1.31 |
| ρ [g/cm$^3$] | | | 2.65 | 2.78 | 2.50 | 2.61 | 2.72 | 2.50 | 2.63 |
| α [×10$^{-7}$/° C.] | | | 32.9 | 34.9 | 33.0 | 35.5 | 36.6 | 35.5 | 38.3 |
| Young's modulus [GPa] | | | 86.0 | 82.6 | 89.1 | 86.5 | 83.9 | 87.9 | 85.2 |
| Specific Young's modulus [GPa/(g/cm$^3$)] | | | 32.5 | 29.7 | 35.6 | 33.1 | 30.8 | 35.1 | 32.4 |
| Ps [° C.] | | | 823 | 824 | 773 | 776 | 780 | 760 | 767 |
| Ta [° C.] | | | 881 | 888 | 828 | 833 | 839 | 814 | 823 |
| Ts [° C.] | | | 1,101 | 1,123 | 1,048 | 1,060 | 1,073 | 1,035 | 1,048 |
| Temperature at $10^{4.0}$ dPa·s [° C.] | | | Not measured | Not measured | 1,345 | 1,368 | 1,405 | 1,339 | 1,362 |
| Temperature at $10^{3.0}$ dPa·s [° C.] | | | Not measured | Not measured | 1,497 | 1,522 | 1,558 | 1,495 | 1,519 |
| Temperature at $10^{2.5}$ dPa·s [° C.] | | | Not measured | Not measured | 1,596 | 1,621 | 1,644 | 1,597 | 1,620 |
| TL [° C.] | | | Not measured | Not measured | 1,377 | 1,355 | 1,354 | 1,296 | 1,305 |
| logηTL [dPa·s] | | | Not measured | Not measured | 3.8 | 4.1 | 4.4 | 4.4 | 4.5 |
| Temperature at $10^{2.5}$ dPa·s − Ps [° C.] | | | Not measured | Not measured | 823 | 845 | 864 | 837 | 853 |
| β-OH [/mm] | | | Not measured | Not measured | Not measured | Not measured | Not measured | Not measured | Not measured |

TABLE 2

| | | No. 17 | No. 18 | No. 19 | No. 20 | No. 21 | No. 22 | No. 23 | No. 24 | No. 25 |
|---|---|---|---|---|---|---|---|---|---|---|
| Composition (mol %) | $SiO_2$ | 63.9 | 63.9 | 63.9 | 65.0 | 65.0 | 69.9 | 69.9 | 69.9 | 69.9 |
| | $Al_2O_3$ | 18.0 | 18.0 | 16.0 | 19.0 | 17.0 | 15.0 | 15.0 | 15.0 | 15.0 |
| | $B_2O_3$ | 0.0 | 0.0 | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 | 0.0 | 0.0 |
| | MgO | 9.0 | 9.0 | 10.0 | 0.0 | 0.0 | 5.0 | 5.0 | 5.0 | 5.0 |
| | CaO | 9.0 | 0.0 | 10.0 | 15.0 | 15.0 | 10.0 | 5.0 | 5.0 | 0.0 |
| | SrO | 0.0 | 9.0 | 0.0 | 0.0 | 0.0 | 0.0 | 5.0 | 0.0 | 10.0 |
| | BaO | 0.0 | 0.0 | 0.0 | 0.0 | 0.0 | 0.0 | 0.0 | 5.0 | 0.0 |
| | $SnO_2$ | 0.1 | 0.1 | 0.1 | 1.0 | 3.0 | 0.1 | 0.1 | 0.1 | 0.1 |
| $Li_2O + Na_2O + K_2O$ | | 0.0 | 0.0 | 0.0 | 0.0 | 0.0 | 0.0 | 0.0 | 0.0 | 0.0 |
| MgO + CaO + SrO + BaO | | 18.0 | 18.0 | 20.0 | 15.0 | 15.0 | 15.0 | 15.0 | 15.0 | 15.0 |
| (Mg + Ca + Sr + Ba)/Al | | 1.00 | 1.00 | 1.25 | 0.79 | 0.88 | 1.00 | 1.00 | 1.00 | 1.00 |
| ρ [g/cm$^3$] | | 2.56 | 2.69 | 2.57 | Not measured | Not measured | 2.51 | 2.58 | 2.66 | 2.65 |
| α [×10$^{-7}$/° C.] | | 36.6 | 39.1 | 38.8 | Not measured | Not measured | 35.4 | 36.9 | 37.8 | 38.4 |
| Young's modulus [GPa] | | 93.1 | 90.0 | 92.1 | Not measured | Not measured | 88.3 | 87.1 | 85.3 | 84.9 |

TABLE 2-continued

| | | | | | | | | | |
|---|---|---|---|---|---|---|---|---|---|
| Specific Young's modulus [GPa/(g/cm³)] | 36.3 | 33.4 | 35.9 | Not measured | Not measured | 35.2 | 33.7 | 32.1 | 32.0 |
| Ps [° C.] | 766 | 771 | 756 | Not measured | Not measured | 776 | 776 | 773 | 782 |
| Ta [° C.] | 818 | 824 | 807 | Not measured | Not measured | 833 | 834 | 833 | 841 |
| Ts [° C.] | 1,019 | 1,032 | 1,007.5 | Not measured | Not measured | 1,051.5 | 1,058 | 1,063.5 | 1,069.5 |
| Temperature at $10^{4.0}$ dPa·s [° C.] | 1,283 | 1,305 | 1,269 | Not measured | Not measured | 1,345 | 1,364 | 1,375 | 1,381 |
| Temperature at $10^{3.0}$ dPa·s [° C.] | 1,417 | 1,442 | 1,404 | Not measured | Not measured | 1,498 | 1,523 | 1,532 | 1,538 |
| Temperature at $10^{2.5}$ dPa·s [° C.] | 1,505 | 1,531 | 1,492 | Not measured | Not measured | 1,595 | 1,625 | 1,632 | 1,639 |
| TL [° C.] | Not measured | 1,386.2 | 1,298.54 | Not measured | Not measured | 1,343.91 | 1,329.66 | 1,329.28 | 1,362.95 |
| logηTL [dPa·s] | Not measured | 3.4 | 3.8 | Not measured | Not measured | 4.0 | 4.3 | 4.4 | 4.1 |
| Temperature at $10^{2.5}$ dPa·s − Ps [° C.] | 739 | 760 | 736 | Not measured | Not measured | 819 | 849 | 859 | 857 |
| β-OH [/mm] | Not measured | Not measured | Not measured | Not measured | Not measured | Not measured | 0.10 | Not measured | Not measured |

| | | No. 26 | No. 27 | No. 28 | No. 29 | No. 30 | No. 31 | No. 32 |
|---|---|---|---|---|---|---|---|---|
| Composition (mol %) | $SiO_2$ | 69.9 | 69.9 | 69.9 | 69.9 | 69.9 | 69.9 | 69.9 |
| | $Al_2O_3$ | 15.0 | 15.0 | 15.0 | 15.0 | 15.0 | 15.0 | 15.0 |
| | $B_2O_3$ | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 |
| | MgO | 5.0 | 10.0 | 10.0 | 10.0 | 6.0 | 7.0 | 2.5 |
| | CaO | 0.0 | 5.0 | 0.0 | 0.0 | 0.0 | 0.0 | 12.5 |
| | SrO | 5.0 | 0.0 | 5.0 | 0.0 | 9.0 | 4.0 | 0.0 |
| | BaO | 5.0 | 0.0 | 0.0 | 5.0 | 0.0 | 4.0 | 0.0 |
| | $SnO_2$ | 0.1 | 0.1 | 0.1 | 0.1 | 0.1 | 0.1 | 0.1 |
| $Li_2O + Na_2O + K_2O$ | | 0.0 | 0.0 | 0.0 | 0.0 | 0.0 | 0.0 | 0.0 |
| MgO + CaO + SrO + BaO | | 15.0 | 15.0 | 15.0 | 15.0 | 15.0 | 15.0 | 15.0 |
| (Mg + Ca + Sr + Ba)/Al | | 1.00 | 1.00 | 1.00 | 1.00 | 1.00 | 1.00 | 1.00 |
| ρ [g/cm³] | | 2.72 | 2.49 | 2.57 | 2.64 | 2.64 | 2.67 | 2.51 |
| α [×$10^{-7}$/° C.] | | 39.5 | 32.2 | 33.7 | 34.3 | 37.2 | 37.0 | 37.5 |
| Young's modulus [GPa] | | 83.4 | 90.7 | 88.7 | 86.9 | 86.0 | 85.3 | 86.9 |
| Specific Young's modulus [GPa/(g/cm³)] | | 30.6 | 36.4 | 34.5 | 32.9 | 32.6 | 31.9 | 34.6 |
| Ps [° C.] | | 782 | 771 | 773 | 774 | 777 | 774 | 786 |
| Ta [° C.] | | 843 | 825 | 830 | 832 | 836 | 833 | 842 |
| Ts [° C.] | | 1,076 | 1,043 | 1,050.5 | 1,056 | 1,065 | 1,066 | 1,062 |
| Temperature at $10^{4.0}$ dPa·s [° C.] | | 1,393 | 1,334 | 1,351 | 1,359 | 1,376 | 1,380 | 1,356 |
| Temperature at $10^{3.0}$ dPa·s [° C.] | | 1,553 | 1,484 | 1,501 | 1,513 | 1,533 | 1,538 | 1,510 |
| Temperature at $10^{2.5}$ dPa·s [° C.] | | 1,655 | 1,581 | 1,601 | 1,611 | 1,632 | 1,638 | 1,608 |
| TL [° C.] | | 1,324.56 | 1,407.6 | 1,391.16 | 1,383.81 | 1,321 | 1,341 | 1,358 |
| logηTL [dPa·s] | | 4.6 | 3.5 | 3.7 | 3.8 | 4.5 | 4.3 | 4.1 |
| Temperature at $10^{2.5}$ dPa·s − Ps [° C.] | | 873 | 810 | 828 | 837 | 855 | 864 | 822 |
| β-OH [/mm] | | Not measured | Not measured | Not measured | Not measured | Not measured | Not measured | Not measured |

TABLE 3

| | | No. 33 | No. 34 | No. 35 | No. 36 | No. 37 | No. 38 | No. 39 | No. 40 | No. 41 | No. 42 |
|---|---|---|---|---|---|---|---|---|---|---|---|
| Composition (mol %) | $SiO_2$ | 69.9 | 69.9 | 69.9 | 69.9 | 69.9 | 69.9 | 69.9 | 69.9 | 69.9 | 69.9 |
| | $Al_2O_3$ | 15.0 | 15.0 | 15.0 | 15.0 | 15.0 | 15.0 | 15.0 | 15.0 | 15.0 | 15.0 |
| | $B_2O_3$ | 0.0 | 0.0 | 0.0 | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 | 0.0 | 0.0 | 0.0 |
| | $Na_2O$ | 0.0 | 0.0 | 0.0 | 0.0 | 0.0 | 0.0 | 0.0 | 0.0 | 0.0 | 0.0 |
| | $K_2O$ | 0.0 | 0.0 | 0.0 | 0.0 | 0.0 | 0.0 | 0.0 | 0.0 | 0.0 | 0.0 |
| | MgO | 2.5 | 2.5 | 2.5 | 2.5 | 7.5 | 7.5 | 5.0 | 5.0 | 2.5 | 3.5 |
| | CaO | 10.0 | 10.0 | 5.0 | 5.0 | 2.5 | 0.0 | 2.5 | 2.5 | 7.5 | 5.0 |
| | SrO | 2.5 | 0.0 | 7.5 | 5.0 | 0.0 | 2.5 | 2.5 | 0.0 | 0.0 | 0.0 |

TABLE 3-continued

|  |  |  |  |  |  |  |  |  |  |  |
|---|---|---|---|---|---|---|---|---|---|---|
|  | BaO | 0.0 | 2.5 | 0.0 | 2.5 | 5.0 | 5.0 | 5.0 | 7.5 | 5.0 | 6.5 |
|  | SnO$_2$ | 0.1 | 0.1 | 0.1 | 0.1 | 0.1 | 0.1 | 0.1 | 0.1 | 0.1 | 0.1 |
| Li$_2$O + Na$_2$O + K$_2$O | | 0.0 | 0.0 | 0.0 | 0.0 | 0.0 | 0.0 | 0.0 | 0.0 | 0.0 | 0.0 |
| MgO + CaO + SrO + BaO | | 15.0 | 15.0 | 15.0 | 15.0 | 15.0 | 15.0 | 15.0 | 15.0 | 15.0 | 15.0 |
| (Mg + Ca + Sr + Ba)/Al | | 1.00 | 1.00 | 1.00 | 1.00 | 1.00 | 1.00 | 1.00 | 1.00 | 1.00 | 1.00 |
| ρ [g/cm$^3$] | | 2.55 | 2.58 | 2.62 | 2.65 | 2.65 | 2.69 | 2.69 | 2.73 | 2.66 | 2.70 |
| α [×10$^{-7}$/° C.] | | 38.0 | 38.5 | 39.5 | 39.9 | 36.0 | 36.9 | 39.1 | 38.9 | 39.7 | 39.5 |
| Young's modulus [GPa] | | 86.4 | 85.6 | 85.0 | 84.3 | 86.5 | 85.4 | 84.6 | 83.5 | 83.9 | 83.4 |
| Specific Young's modulus [GPa/(g/cm$^3$)] | | 33.9 | 33.1 | 32.4 | 31.8 | 32.7 | 31.8 | 31.4 | 30.6 | 31.5 | 30.9 |
| Ps [° C.] | | 784 | 780 | 783 | 782 | 774 | 778 | 777 | 780 | 782 | 779 |
| Ta [° C.] | | 842 | 838 | 842 | 841 | 832 | 837 | 837 | 840 | 841 | 839 |
| Ts [° C.] | | 1,063.5 | 1,065.5 | 1,071.5 | 1,074 | 1,062 | 1,068 | 1,072 | 1,075 | 1,072 | 1,074 |
| Temperature at 10$^{4.0}$ dPa · s [° C.] | | 1,363 | 1,368 | 1,381 | 1,388 | 1,370 | 1,379 | 1,385 | 1,393 | 1,384 | 1,391 |
| Temperature at 10$^{3.0}$ dPa · s [° C.] | | 1,519 | 1,522 | 1,539 | 1,546 | 1,527 | 1,537 | 1,544 | 1,551 | 1,544 | 1,548 |
| Temperature at 10$^{2.5}$ dPa · s [° C.] | | 1,617 | 1,621 | 1,638 | 1,646 | 1,627 | 1,639 | 1,644 | 1,651 | 1,646 | 1,649 |
| TL [° C.] | | 1,334.11 | 1,322.68 | 1,354.81 | 1,344 | 1,366 | 1,364 | 1,301 | 1,323 | 1,302 | 1,278 |
| logηTL [dPa · s] | | 4.2 | 4.2 | 4.5 | 4.4 | 4.0 | 4.1 | 4.7 | 4.6 | 4.7 | 5.0 |
| Temperature at 10$^{2.5}$ dPa · s − Ps [° C.] | | 833 | 841 | 855 | 864 | 853 | 861 | 867 | 871 | 864 | 870 |
| β-OH [/mm] | | Not measured | Not measured | Not measured | Not measured | Not measured | Not measured | Not measured | Not measured | Not measured | Not measured |

|  |  | No. 43 | No. 44 | No. 45 | No. 46 | No. 47 | No. 48 | No. 49 | No. 50 | No. 51 | No. 52 |
|---|---|---|---|---|---|---|---|---|---|---|---|
| Composition (mol %) | SiO$_2$ | 70.9 | 70.9 | 69.9 | 68.9 | 70.9 | 70.9 | 69.9 | 68.9 | 71.9 | 71.9 |
|  | Al$_2$O$_3$ | 15.0 | 14.0 | 16.0 | 16.0 | 15.0 | 14.0 | 16.0 | 16.0 | 14.0 | 13.0 |
|  | B$_2$O$_3$ | 0.0 | 0.0 | 0.0 | 0.0 | 0.0 | 0.0 | 0.0 | 0.0 | 0.0 | 0.0 |
|  | Li$_2$O | 0.0 | 0.0 | 0.0 | 0.0 | 0.0 | 0.0 | 0.0 | 0.0 | 0.0 | 0.0 |
|  | Na$_2$O | 0.0 | 0.0 | 0.0 | 0.0 | 0.0 | 0.0 | 0.0 | 0.0 | 0.0 | 0.0 |
|  | K$_2$O | 0.0 | 0.0 | 0.0 | 0.0 | 0.0 | 0.0 | 0.0 | 0.0 | 0.0 | 0.0 |
|  | MgO | 4.7 | 5.0 | 4.7 | 5.0 | 3.3 | 3.5 | 3.3 | 3.5 | 4.7 | 5.0 |
|  | CaO | 2.3 | 2.5 | 2.3 | 2.5 | 4.7 | 5.0 | 4.7 | 5.0 | 2.3 | 2.5 |
|  | SrO | 2.3 | 2.5 | 2.3 | 2.5 | 0.0 | 0.0 | 0.0 | 0.0 | 2.3 | 2.5 |
|  | BaO | 4.7 | 5.0 | 4.7 | 5.0 | 6.1 | 6.5 | 6.1 | 6.5 | 4.7 | 5.0 |
|  | SnO$_2$ | 0.1 | 0.1 | 0.1 | 0.1 | 0.1 | 0.1 | 0.1 | 0.1 | 0.1 | 0.1 |
| Li$_2$O + Na$_2$O + K$_2$O | | 0.0 | 0.0 | 0.0 | 0.0 | 0.0 | 0.0 | 0.0 | 0.0 | 0.0 | 0.0 |
| MgO + CaO + SrO + BaO | | 14.0 | 15.0 | 14.0 | 15.0 | 14.0 | 15.0 | 14.0 | 15.0 | 14.0 | 15.0 |
| (Mg + Ca + Sr + Ba)/Al | | 0.93 | 1.07 | 0.88 | 0.94 | 0.93 | 1.07 | 0.88 | 0.94 | 1.00 | 1.15 |
| ρ [g/cm$^3$] | | 2.67 | 2.68 | 2.68 | 2.70 | 2.68 | 2.69 | 2.69 | 2.71 | 2.65 | 2.66 |
| α [×10$^{-7}$/° C.] | | 37.0 | 38.7 | 36.7 | 38.5 | 38.1 | 39.8 | 37.7 | 39.3 | 37.7 | 39.2 |
| Young's modulus [GPa] | | 84.5 | 83.7 | 85.5 | 85.5 | 83.6 | 82.5 | 84.7 | 84.6 | 85.1 | 84.3 |
| Specific Young's modulus [GPa/(g/cm$^3$)] | | 31.7 | 31.2 | 31.9 | 31.7 | 31.2 | 30.6 | 31.5 | 31.2 | 32.1 | 31.6 |
| Ps [° C.] | | 781 | 774 | 782 | 779 | 784 | 777 | 787 | 783 | 780 | 770 |
| Ta [° C.] | | 841 | 834 | 842 | 838 | 845 | 837 | 846 | 843 | 842 | 832 |
| Ts [° C.] | | 1,077 | 1,072 | 1,073 | 1,068 | 1,081 | 1,075 | 1,078 | 1,071 | 1,087 | 1,076 |
| Temperature at 10$^{4.0}$ dPa · s [° C.] | | 1,400 | 1,396 | 1,385 | 1,375 | 1,403 | 1,401 | 1,392 | 1,378 | 1,410 | 1,404 |
| Temperature at 10$^{3.0}$ dPa · s [° C.] | | 1,559 | 1,555 | 1,540 | 1,528 | 1,563 | 1,562 | 1,548 | 1,531 | 1,573 | 1,568 |
| Temperature at 10$^{2.5}$ dPa · s [° C.] | | 1,660 | 1,657 | 1,637 | 1,626 | 1,664 | 1,667 | 1,648 | 1,627 | 1,677 | 1,674 |
| TL [° C.] | | >1,373 | 1,290 | >1,371 | >1,373 | >1,371 | 1,274 | >1,373 | >1,371 | Not measured | Not measured |
| logηTL [dPa · s] | | <4.2 | 4.9 | <4.1 | <4.0 | <4.2 | 5.1 | <4.2 | <4.1 | Not measured | Not measured |
| Temperature at 10$^{2.5}$ dPa · s − Ps [° C.] | | 879 | 883 | 855 | 847 | 880 | 890 | 861 | 844 | 897 | 903 |
| β-OH [/mm] | | Not measured | Not measured | Not measured | Not measured | Not measured | Not measured | Not measured | Not measured | Not measured | Not measured |

TABLE 4

|  |  | No. 53 | No. 54 | No. 55 | No. 56 | No. 57 | No. 58 |
|---|---|---|---|---|---|---|---|
| Composition (mol %) | SiO$_2$ | 71.9 | 71.9 | 70.9 | 69.9 | 68.9 | 67.9 |
|  | Al$_2$O$_3$ | 14.0 | 14.0 | 14.0 | 14.0 | 15.0 | 16.0 |
|  | B$_2$O$_3$ | 0.0 | 0.0 | 0.0 | 0.0 | 0.0 | 0.0 |
|  | Li$_2$O | 0.0 | 0.0 | 0.0 | 0.0 | 0.0 | 0.0 |

TABLE 4-continued

|  | No. 53 | No. 54 | No. 55 | No. 56 | No. 57 | No. 58 |
|---|---|---|---|---|---|---|
| $Na_2O$ | 0.0 | 0.0 | 0.0 | 0.0 | 0.0 | 0.0 |
| $K_2O$ | 0.0 | 0.0 | 0.0 | 0.0 | 0.0 | 0.0 |
| MgO | 3.3 | 7.0 | 7.5 | 8.0 | 8.0 | 8.0 |
| CaO | 4.7 | 0.0 | 0.0 | 0.0 | 0.0 | 0.0 |
| SrO | 0.0 | 7.0 | 7.5 | 8.0 | 8.0 | 8.0 |
| BaO | 6.1 | 0.0 | 0.0 | 0.0 | 0.0 | 0.0 |
| $SnO_2$ | 0.1 | 0.1 | 0.1 | 0.1 | 0.1 | 0.1 |
| $Li_2O + Na_2O + K_2O$ | 0.0 | 0.0 | 0.0 | 0.0 | 0.0 | 0.0 |
| MgO + CaO + SrO + BaO | 14.0 | 14.0 | 15.0 | 16.0 | 16.0 | 16.0 |
| (Mg + Ca + Sr + Ba)/Al | 1.00 | 1.00 | 1.07 | 1.14 | 1.07 | 1.00 |
| $\rho$ [g/cm$^3$] | 2.66 | 2.58 | 2.60 | 2.62 | 2.63 | 2.63 |
| $\alpha$ [×10$^{-7}$/° C.] | 38.7 | 35.2 | 36.4 | 37.6 | 37.5 | 37.3 |
| Young's modulus [GPa] | 83.8 | 88.2 | 88.5 | 88.8 | 89.6 | 90.5 |
| Specific Young's modulus [GPa/(g/cm$^3$)] | 31.5 | 34.2 | 34.0 | 33.9 | 34.1 | 34.3 |
| Ps [° C.] | 781 | 776 | 771 | 766 | 771 | 776 |
| Ta [° C.] | 843 | 838 | 832 | 825 | 829 | 834 |
| Ts [° C.] | 1,087.8 | 1,078.79 | 1,067.81 | 1,057 | 1,057 | 1,057 |
| Temperature at 10$^{4.0}$ dPa·s [° C.] | 1,412.54 | 1,394.52 | 1,379.62 | 1,365 | 1,358 | 1,351 |
| Temperature at 10$^{3.0}$ dPa·s [° C.] | 1,575.49 | 1,555.09 | 1,537.88 | 1,521 | 1,509 | 1,498 |
| Temperature at 10$^{2.5}$ dPa·s [° C.] | 1,679.49 | 1,657.72 | 1,639.34 | 1,621 | 1,607 | 1,593 |
| TL [° C.] | Not measured | Not measured | Not measured | Not measured | Not measured | Not measured |
| log$\eta$TL [dPa·s] | Not measured | Not measured | Not measured | Not measured | Not measured | Not measured |
| Temperature at 10$^{2.5}$ dPa·s − Ps [° C.] | 898 | 882 | 868 | 855 | 836 | 817 |
| β-OH [/mm] | Not measured | Not measured | Not measured | Not measured | Not measured | Not measured |

Each sample was produced in the following manner. First, a glass batch prepared by blending glass raw materials so that each glass composition listed in the tables was attained was placed in a platinum crucible, and then melted at from 1,600° C. to 1,750° C. for 24 hours. When the glass batch was dissolved, molten glass was stirred to be homogenized by using a platinum stirrer. Next, the molten glass was poured on a carbon sheet and formed into a glass having a flat sheet shape. Each of the resultant samples was evaluated for its density ρ, thermal expansion coefficient α, strain point Ps, annealing point Ta, softening point Ts, temperature at a viscosity at high temperature of 10$^{4.0}$ dPa·s, temperature at a viscosity at high temperature of 10$^{3.0}$ dPa·s, temperature at a viscosity at high temperature of 10$^{2.5}$ dPa·s, liquidus temperature TL, and liquidus viscosity log ηTL.

The density ρ is a value obtained by measurement by a well-known Archimedes method.

The thermal expansion coefficient α is an average value measured in the temperature range of from 30° C. to 380° C. with a dilatometer.

The strain point Ps, the annealing point Ta, and the softening point Ts are values obtained by measurement in conformity with ASTM C336 or ASTM C338.

The temperature at a viscosity at high temperature of 10$^{4.0}$ dPa·s, the temperature at a viscosity at high temperature of 10$^{3.0}$ dPa·s, and the temperature at a viscosity at high temperature of 10$^{2.5}$ dPa·s are values obtained by measurement by a platinum sphere pull up method.

The liquidus temperature TL is a temperature at which devitrification (a devitrified crystal) was observed in the glass when each of the samples was pulverized, and glass powder that passed through a standard 30-mesh sieve (500 μm) and remained on a 50-mesh sieve (300 μm) was placed in a platinum boat and kept for 24 hours in a gradient heating furnace, followed by taking the platinum boat out of the gradient heating furnace. The liquidus viscosity log ηTL is a value obtained by measuring the viscosity of the glass at the liquidus temperature TL by a platinum sphere pull up method.

The β-OH value is a value calculated by using the above-mentioned equation.

As is apparent from Tables 1 to 4, Sample Nos. 1 to 58 each have a high strain point, has a low thermal expansion coefficient, and has meltability and devitrification resistance at levels at which mass production can be performed. Accordingly, Sample Nos. 1 to 58 are each considered to be suitable for a substrate of an OLED display.

INDUSTRIAL APPLICABILITY

The glass of the present invention has a high strain point, has a low thermal expansion coefficient, and has meltability and devitrification resistance at levels at which mass production can be performed. Therefore, other than for the substrate of an OLED display, the glass of the present invention is also suitable for a substrate for a display of a liquid crystal display or the like, particularly for a substrate for a display driven by a LTPS or oxide TFT. Further, the glass of the present invention is also suitable for a substrate for an LED for forming a semiconductor substance at high temperature.

The invention claimed is:

1. A glass, comprising as a glass composition, in terms of mol %, 55% to 80% of $SiO_2$, 14% to 20% of $Al_2O_3$, 0% to 1% of $B_2O_3$, 0% to 1% of $Li_2O+Na_2O+K_2O$, 1% to 15% of BaO, 5% to 20% of MgO+CaO+SrO+BaO, 0% to less than 0.1% of $Y_2O_3+La_2O_3$, and a molar ratio (MgO+CaO+SrO+BaO)/$Al_2O_3$ of 1.15 or less, and having a thermal expansion coefficient within a temperature range of from 30° C. to 380° C. of less than 40×10$^{-7}$/° C.

2. The glass according to claim 1, wherein the glass has a content of $B_2O_3$ of less than 1 mol %.

3. The glass according to claim 1, wherein the glass has a content of $Li_2O+Na_2O+K_2O$ of 0.5 mol % or less.

4. The glass according to claim 1, wherein the glass has a molar ratio $(MgO+CaO+SrO+BaO)/Al_2O_3$ of 0.3 to 1.15.

5. The glass according to claim 1, wherein the glass has a molar ratio $MgO/(MgO+CaO+SrO+BaO)$ of 0.5 or more.

6. The glass according to claim 1, wherein the glass has a strain point of 750° C. or more.

7. The glass according to claim 1, wherein the glass has a strain point of 800° C. or more.

8. The glass according to claim 1, wherein the glass has a difference of (a temperature at a viscosity of $10^{2.5}$ dPa·s-strain point) of 1,000° C. or less.

9. The glass according to claim 1, wherein the glass has a temperature at a viscosity of $10^{2.5}$ dPa·s of 1,800° C. or less.

10. The glass according to claim 1, wherein the glass has a flat sheet shape.

11. The glass according to claim 1, wherein the glass is used for a substrate of an OLED display.

12. The glass according to claim 1, wherein the glass has a content of $Al_2O_3$ in terms of mol % of 15% to 20%.

* * * * *